United States Patent
Liu et al.

(10) Patent No.: US 9,963,530 B2
(45) Date of Patent: May 8, 2018

(54) CURABLE THERMOSETTING RESIN COMPOSITION

(71) Applicant: CHANGZHOU BAMSTONE COMPOSITES CO., LTD., Changzhou (CN)

(72) Inventors: Wei Liu, Changzhou (CN); Ruimin Xiao, Changzhou (CN); Lu Wang, Changzhou (CN)

(73) Assignee: CHANGZHOU BAMSTONE COMPOSITES CO., LTD., Changzhou (CN)

( * ) Notice: Subject to any disclaimer, the term of this patent is extended or adjusted under 35 U.S.C. 154(b) by 0 days. days.

(21) Appl. No.: 15/555,085

(22) PCT Filed: Sep. 21, 2015

(86) PCT No.: PCT/CN2015/000652
§ 371 (c)(1),
(2) Date: Sep. 1, 2017

(87) PCT Pub. No.: WO2017/041201
PCT Pub. Date: Mar. 16, 2017

(65) Prior Publication Data
US 2018/0051112 A1    Feb. 22, 2018

(30) Foreign Application Priority Data

Sep. 8, 2015    (CN) .......................... 2015 1 0568002

(51) Int. Cl.
*C08L 63/00*   (2006.01)
*C08F 212/08*  (2006.01)
*C08J 5/24*    (2006.01)

(52) U.S. Cl.
CPC .............. *C08F 212/08* (2013.01); *C08J 5/24* (2013.01); *C08L 63/00* (2013.01); *C08J 2363/00* (2013.01); *C08J 2425/08* (2013.01); *C08L 2203/20* (2013.01)

(58) Field of Classification Search
None
See application file for complete search history.

(56) References Cited

U.S. PATENT DOCUMENTS

2014/0128545 A1* 5/2014 Xiong ................ C08J 5/24
                                                    525/117

FOREIGN PATENT DOCUMENTS

| CN | 103842433 A | 6/2014 |
|----|-------------|--------|
| CN | 104650281 A | 5/2015 |
| EP | 0699724 A1  | 3/1996 |

(Continued)

*Primary Examiner* — David J Buttner
(74) *Attorney, Agent, or Firm* — Gokalp Bayramoglu

(57) ABSTRACT

A curable thermosetting resin composition, including a multicomponent copolymer and an epoxy resin. The multicomponent copolymer is a ternary or quaternary copolymer having structural units selected from the group consisting of unit (I), unit (II), unit (III) and (IV). The structural unit (I) is the structural unit (II) is the structural unit (III) is and the structural unit (IV) is where m, n, r and s are natural numbers denoting the molar fraction of corresponding building blocks in the copolymers respectively, R is selected from the group consisting of hydrogen, aromatic group and aliphatic group, and AR is an aromatic group; and the epoxy resin is one or more selected from a group consisting of (Continued)

aromatic epoxy compound, alicyclic epoxy compound and aliphatic epoxy compound.

11 Claims, No Drawings

(56) References Cited

FOREIGN PATENT DOCUMENTS

| | | | |
|---|---|---|---|
| JP | 2001019744 A | | 1/2001 |
| JP | 2001200013 | * | 7/2001 |
| WO | WO2013000151 A1 | | 1/2013 |

* cited by examiner

CURABLE THERMOSETTING RESIN COMPOSITION

CROSS REFERENCE TO RELATED APPLICATIONS

This application is the national phase entry of International Application No. PCT/CN2015/000652, filed on Sep. 21, 2015, which is based upon and claims priority to Chinese Patent Application No. CN2015105680025, filed on Sep. 8, 2015, the entire contents of which are incorporated herein by reference.

TECHNICAL FIELD

The present invention relates to a polymer compound and preparation thereof, and particularly to a curable thermosetting resin composition comprising a multicomponent copolymer and an epoxy resin.

BACKGROUND

A curable thermosetting resin composition comprising an epoxy resin and a curing agent thereof is widely used in composite materials, coatings, and other fields. In the application areas of electrical insulation composite materials and wave-transmitting composite materials, the glass transition temperature, the dielectric constant and dielectric loss factor, and the flame resistance are very critical technical indices. For example, for electrical insulation products such as laminated composite sheets and PCB boards, a high enough glass transition temperatures allows the material to be efficiently used in a high-temperature environment, and a low dielectric constant and dielectric loss factor contribute to the separation of a current carrying region from other regions. For wave-transmitting products such as mobile communication base station antenna covers, a low dielectric constant and dielectric loss factor can effectively increase the wave transmittance.

In order to achieve a high glass transition temperature, and a low dielectric constant and dielectric loss factor, the previous method is to add various materials to the curable thermosetting resin composition, for example, SMA (a styrene-maleic anhydride copolymer), a cyanate ester, a ternary copolymer of styrene-maleic anhydride-maleimide, and the like. Chinese Invention Patent No. CN 103842433 A discloses an epoxy resin composition containing a terpolymer of styrene, maleic anhydride, and maleimide, which can effectively reduce the dielectric constant and improve the glass transition temperature. In addition, the requirement for flame resistance is generally satisfied by introducing the elements halogen and phosphorus, for example, by using a halogen-containing epoxy resin, and adding a phosphorus-containing polyphenylene ether resin.

The requirements of high glass transition temperature, low dielectric constant and dielectric loss factor, and flame resistance are still failed to be met by the existing methods by adding a simple substance. In addition, the addition of inactive additives which contain no reactive functional groups capable of reacting with the epoxy resin will generally reduce other properties of the composition.

SUMMARY

In order to solve the problems above, the present invention provides a multicomponent copolymer, which is added to an epoxy resin-based thermosetting resin, to form a curable thermosetting resin composition, so as to meet the requirements of high glass transition temperature, low dielectric constant and dielectric loss factor, and high flame resistance.

The object of the present invention is achieved by adopting the following technical solutions. A multicomponent copolymer is provided, which is a ternary or quaternary copolymer comprising structural units (I), (II), (III), or (IV), and the structural units (I), (II), and (III) are essential structural units.

The structural unit (I) is:

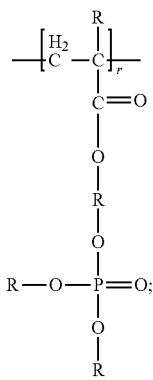

the structural unit (II) is:

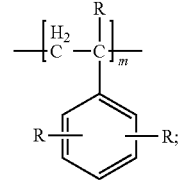

the structural unit (III) is:

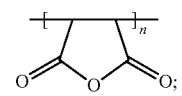

and
the structural unit (IV) is:

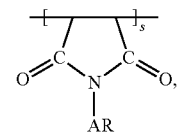

where m, n, r and s are each independently a natural number denoting the molar fraction of a corresponding building block in the copolymer, R is selected from the group consisting of hydrogen, an aromatic group or an aliphatic group, and AR is each independently an aromatic group.

The structural unit (I) mainly serves to introduce a phosphorus element, which imparts the flame resistance to the cured product, and improves the interfacial property and adhesive property of the composite material. The structural unit (II) mainly serves to impart low dielectric properties to the cured product. The structural unit (III) introduces an active functional group capable of reacting with the epoxy resin to the copolymer. The structural unit IV mainly serves to impart a high glass transition temperature to the cured product. Expected properties of the cured product can be obtained through flexible combination of the 4 structural units.

In the present invention, the structural units (I), (II), and (III) are essential units. The copolymers comprising exclusively the structural units (II) and (III) or exclusively the structural units (II), (III), and (IV) are special forms of the copolymer discussed above, which have been disclosed in other patents and thus are not embraced in the present invention.

The curable thermosetting resin composition of the present invention further comprises an epoxy resin. In the composition, the weight ratio of the multicomponent copolymer to the epoxy resin is 5-100:100, and preferably 5:100, 10:100, 15:100, 22:100, 25:100, 30:100, 40:100, 50:100, 60:100, 70:100, 80:100, 90:100, and 100:100. The epoxy resin is one of an aromatic epoxy compound, an alicyclic epoxy compound, and an aliphatic epoxy compound, or a combination thereof. The cured product of the curable thermosetting resin composition has a glass transition temperature of at least 120° C., and a dielectric constant of 3.1 or less and a dielectric loss factor of 0.01 or less at a frequency of 1 GHZ or higher.

The present invention further relates to a composite material, which comprises a reinforcing component and the above curable thermosetting resin composition. The reinforcing component is glass fiber, quartz fiber, basalt fiber, basalt aramid fiber, or other fibers useful as a reinforcement in a composite material, and a combination thereof.

The present invention has the following beneficial effects. In the present invention, the "phosphorus" element is creatively introduced into a ternary or quaternary copolymer that is capable of undergoing a cross-linking reaction with an epoxy resin, and the ternary or quaternary copolymer is mixed with the epoxy resin and other components to form a composition meeting all the requirements that the cured product has a high glass transition temperature, a low dielectric constant and dielectric loss factor, and a certain flame resistance. The composition is widely applicable to composite materials which require low dielectric properties such as printed circuit boards, high voltage insulators, mobile communication base station antenna covers and the like.

Moreover, the "phosphate" functional group can also react with the reinforcing material such as glass fiber to act as a "coupling agent", thereby enhancing the interface adhesion properties of the composite material. In addition, the phosphate may form a chemical bond with a metal, thus increasing the adhesion between the composite material and metal.

The foregoing summary of the invention is not intended to describe each or every embodiments or implementations of the present invention. An embodiment of the present invention is particularly exemplified later in this specification. Several examples are provided for guidance somewhere the present application, which may be used in various combinations. In each instance, the lists shown are used only as representative groups and should not be interpreted as exhaustive.

DETAILED DESCRIPTION

The present invention will be described in detail below.

An embodiment of the present invention provides a curable thermosetting resin composition. In various embodiments, the curable thermosetting resin composition of the present invention comprises a multicomponent copolymer, an epoxy resin, and other components. As discussed in this application, the multicomponent copolymer is a copolymer of styrene, maleic anhydride, and N-phenyl maleimide, which is modified with a phosphate ester. A cured product having appropriate thermal property, electrical property, and flame resistance is provided with the curable thermosetting resin composition of the present invention. The appropriate thermal property is mainly embodied as the glass transition temperature, and the appropriate electrical property includes the dielectric constant and the dielectric loss factor. The cured product of the curable thermosetting resin composition according to the present invention is useful in electrical insulation packages, composite materials, electrical insulation laminates, adhesives, prepregs and coatings.

In various embodiments, the multicomponent copolymer has the following three or four structural units:

a structural unit (I) of:

a structural unit (II) of:

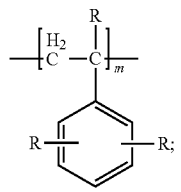

a structural unit (III) of:

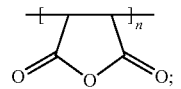

and
a structural unit (IV) of:

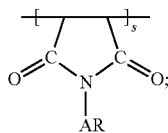

where m, n, r and s are each independently a natural number denoting the molar fraction of a corresponding building block in the copolymer, R is each independently hydrogen, an aromatic group or an aliphatic group, and AR is each independently an aromatic group. The structural units (I), (II), and (III) are essential units.

In various embodiments, the structural unit (I) accounts for 0.1-60 wt %, and preferably 0.5 wt %, 1 wt %, 3 wt %, 5.5 wt %, 10 wt %, 11 wt %, 15 wt %, 20 wt %, 40 wt %, 50 wt %, and 60 wt % of the copolymer. The molar ratio of the structural unit (II) to the structural unit (III) is 1:1-20:1, and preferably 1:1, 2:1, 3:1, 4:1, 5:1, 6:1, 7:1, 8:1, 9:1, 10:1, 11:1, 12:1, 15:1, 16:1, 17:1, 18:1, 19:1, and 20:1. The structural unit (IV) accounts for 0-60 wt %, and preferably 0, 1 wt %, 2 wt %, 3 wt %, 4 wt %, 5 wt %, 6 wt %, 7 wt %, 8 wt %, 9 wt %, 10 wt %, 11 wt %, 12 wt %, 15 wt %, 18 wt %, 20 wt %, 25 wt %, 30 wt %, 36 wt %, 45 wt %, 50 wt %, 55 wt %, 58 wt %, and 60 wt % of the copolymer.

In various embodiments, the multicomponent copolymer may be prepared with monomers corresponding to respective structural units through free radical copolymerization. The monomer corresponding to structural unit (I) include, but is not limited to, hydroxyethyl (meth)acrylate phosphate, hydroxypropyl (meth)acrylate phosphate, polyethylene glycol methacrylate phosphate, polypropylene glycol methacrylate phosphate, and the like. The monomer mainly used is generally a mixture containing hydroxyethyl acrylate phosphate as a main component, for example, SIPOMER PAM-100 from SOLVAY, P-1M and P-2M from Kyoei Shoji Co Ltd., PM1000 and PM1500 from Guangzhou Jingde Chemistry Co., Ltd., and so on. The monomer corresponding to the structural unit (II) comprises, but is not limited to, styrene, α-methylstyrene, vinyl toluene, divinyl benzene, and the like. The monomer mainly used is styrene. The monomer corresponding to the structural unit (III) comprises maleic anhydride. The monomer corresponding to the structural unit (IV) comprises, but is not limited to, N-phenyl maleimide.

The monomers of desired molar ratio are mixed and dissolved in a suitable solvent (e.g. butanone), and placed in a reactor. An appropriate initiator and chain transfer agent are added, heated, and stirred until uniform, and a free radical polymerization reaction is carried out at a controlled temperature. After the polymerization is completed, the resulting material is purified and the solvent is distilled off under reduced pressure to obtain a product In various embodiments, another method for preparing the multicomponent copolymer comprises: copolymerizing an acrylic monomer having a hydroxyl functionality in place of the monomer corresponding to structural unit (I), with monomers corresponding to one or more of structural units (II), (III) and (IV); and after the polymerization is completed, reacting the copolymerization product, that is, a polymer having a hydroxyl group on the side chain, with one of $P_2O_5$, pyrophosphoric acid, polyphosphoric acid, and phosphorus oxychloride, to produce a phosphate, then purifying, and removing the solvent, to obtain the product.

In one or more embodiments, the curable thermosetting resin composition comprises an epoxy resin. The epoxy resin is one of an aromatic epoxy compound, an alicyclic epoxy compound, and an aliphatic epoxy compound, or a combination thereof. Examples of the aromatic epoxy compound include, but are not limited to, glycidyl ether compounds of polyhydric phenol, and a combination thereof. Examples of the alicyclic epoxy compound include, but are not limited to, polyglycidyl ethers of polyols having at least one alicyclic ring, or compounds including cyclohexamethylene oxide or cyclopentamethylene oxide obtained by epoxidizing compounds including cyclohexene ring or cyclopentene ring with an oxidant. Examples of the aliphatic epoxy compound include, but are not limited to, polyglycidyl ethers of aliphatic polyols or adducts thereof with alkylene oxides, polyglycidyl esters of aliphatic long chain polyacids, homopolymers synthesized by vinyl polymerization of glycidyl acrylate or glycidyl methacrylate, and copolymers synthesized by polymerization of glycidyl acrylate or glycidyl methacrylate with an vinyl group of other vinyl monomers.

In various embodiments, the curable thermosetting resin composition may comprise a solvent. The solvent may be selected from methylethyl ketone (MEK), toluene, xylene, N,N-dimethylformamide (DMF), propylene glycol methyl ether (PM), cyclohexanone, propylene glycol methyl ether acetate (DOWANOL™ PMA), and a mixture thereof. In various embodiments, the solvent is added in an amount of 30-60 wt % and preferably 30 wt %, 35 wt %, 38 wt %, 40 wt %, 44 wt %, 49 wt %, 50 wt %, 53 wt %, 55 wt %, 57 wt %, and 60 wt %, based on the total weight of the curable thermosetting resin composition.

In various embodiments, the curable thermosetting resin composition may comprise a catalyst. Examples of the catalyst include, but are not limited to, tris-(dimethylaminomethyl) phenol (DMP-30), 2-methylimidazole (2MI), 2-phenylimidazole (2PI), 2-ethyl-4-methylimidazole (2E4MI), 1-phenylmethyl-2-phenylimidazole (1B2PZ), boric acid, triphenylphosphine (TPP), tetraphenylphosphonium-tetraphenylborate (TPP-k) and combinations thereof. In various embodiments, the catalyst is added in an amount of 0.01-2.0 wt %, and preferably 0.05 wt %, 0.1 wt %, 0.4 wt %, 0.7 wt %, 1.0 wt %, 1.4 wt %, 1.5 wt %, and 2.0 wt % based on the weight of the solid components in the curable thermosetting resin composition.

In various embodiments, the curable thermosetting resin composition may comprise a curing agent. The curing agent can react with an epoxy group on the epoxy compound, and may be selected from phenolic resins, amines, anhydrides, carboxylic acids, phenols, thiols and combinations thereof. In various embodiments, the curing agent is added in an amount of 1-90 wt %, and preferably 10 wt %, 20 wt %, 30 wt %, 40 wt %, 50 wt %, 60 wt %, 70 wt %, 80 wt %, and 90 wt % based on the weight of the solid components in the curable thermosetting resin composition.

In one or more embodiments, the curable thermosetting resin composition may comprise an additive. The additive is selected from dyes, pigments, colorants, antioxidants, heat stabilizers, light stabilizers, plasticizers, lubricants, flow modifiers, antifogging agents, flame retardants, anti-blocking agents, release agents, toughening agents, low profile additives, stress releasing additives, and combinations thereof In various embodiments, the cured product formed of the curable thermosetting resin composition of the present invention discussed herein has a glass transition temperature of at least 120° C.

In various embodiments, the cured product formed of the curable thermosetting resin composition of the present invention discussed herein has a dielectric constant of 3.1 or less and a dielectric loss factor of 0.01 or less at a frequency of 1 GHz.

Embodiments of the present invention provide a composite material comprising a reinforcing component and the curable thermosetting resin composition as discussed in this application. The composite material is obtained by reinforcing the curable thermosetting resin composition with a reinforcing material. The reinforcing material includes, but is not limited to, glass fiber, quartz fiber, basalt fiber, basalt aramid fiber, or other fibers useful as a reinforcement in a composite material, and a combination thereof.

EXAMPLES

Hereinafter, the present invention will be described in further detail by way of examples. In the examples of the present invention, the "parts" are parts by weight, unless otherwise indicated specifically.

Synthesis Example 1: Synthesis of Multicomponent Copolymer (P1-1)

To a 500 ml four-neck flask, 83.3 g of styrene, 34.6 g of N-phenyl maleimide, 19.6 g of maleic anhydride, and then 1.375 g of the initiator BPO, a suitable amount of a chain transfer agent, 200 g of the solvent butanone, and 13.75 g of PAM-100 were added, heated, stirred until uniform, and reacted for 6-8 hrs at a reaction temperature controlled to 80° C. The reaction solution was distilled under reduced pressure to remove the solvent. A quaternary copolymer (P1-1) was obtained.

Synthesis Example 2: Synthesis of Multicomponent Copolymer (P1-2)

To a 500 ml four-neck flask, 83.3 g of styrene, 34.6 g of N-phenyl maleimide, 19.6 g of maleic anhydride, 8.5 g of hydroxyethyl methacrylate, and then 1.375 g of the initiator BPO, a suitable amount of a chain transfer agent, and 200 g of the solvent butanone were added, heated, stirred until uniform, and reacted for 6-8 hrs at a reaction temperature controlled to 80° C. Next, 4.6 g of P2O5 was added and reacted for further 3-4 hrs while the reaction temperature was maintained. The temperature was reduced to 60° C., a suitable amount of deionized water was added, and hydrolysis was conducted for 1 hrs. Finally, the reaction solution was distilled under reduced pressure to remove the solvent. A quaternary copolymer (P1-2) was obtained.

Synthesis Example 3: Synthesis of Multicomponent Copolymer (P1-3)

To a 500 ml four-neck flask, 83.3 g of styrene, 19.6 g of maleic anhydride, and then 1.375 g of the initiator BPO, a suitable amount of a chain transfer agent, 200 g of the solvent butanone, and 13.75 g of PAM-100 were added, heated, stirred until uniform, and reacted for 6-8 hrs at a reaction temperature controlled to 80° C. The reaction solution was distilled under reduced pressure to remove the solvent. A ternary copolymer (P1-3) was obtained.

Examples 1, 2, and 3, and Comparative Examples 1 and 2

Based on the formulation ratio shown in Table 1, the multicomponent copolymers (P1-1, P1-2, and P1-3) obtained in Synthesis Examples 1-3, a purchased copolymer of styrene and maleic anhydride (Sartomer SMA4000), an epoxy resin (DIC 850S, Nantong Xingchen Synthetic Material Company Limited), a curing agent (MeTHPA), a catalyst (Ancamine K54) were mixed, cured by heating, and tested for the dielectric constant, the dielectric loss factor, the glass transition temperature, and the limiting oxygen index (LOI) following the methods below.

(1) Test of dielectric constant and dielectric loss factor

The dielectric constant and the dielectric loss factor of a casted plate of cured pure resin were determined at a frequency of 1 GHz by using the HP4291B dielectric constant tester (manufactured by Hewllet. Packerd Corp.).

(2) Test of glass transition temperature

The glass transition temperature of a casted plate of cured pure resin was determined by using DSC 4000 (manufactured by PerkinElmer Corp.) at a temperature ramping from 30 to 180° C. at a rate of 10 K/min.

(3) Test of limiting oxygen index (LOI)

The LOI of a casted plate of cured pure resin was determined by using an LOI tester, following a standard method as specified in GB/T 2406.2-2009 Determination of burning behavior by oxygen index—Part 2: Ambient-temperature test.

TABLE 1

| | Item | Example 1 | Example 2 | Example 3 | Comparative Example 1 | Comparative Example 2 |
|---|---|---|---|---|---|---|
| Formulation ratio | P1-1 | 10 parts | — | — | — | — |
| | P1-2 | — | 10 parts | — | — | — |
| | P1-3 | — | — | 10 parts | — | — |
| | SMA4000 | — | — | — | — | 10 parts |
| | Epoxy resin(850S) | 100 parts | 100 parts | 100 parts | 100 parts | 100 parts |
| | Curing agent (MeTHPA) | 80 parts | 80 parts | 80 parts | 80 parts | 80 parts |
| | Catalyst (K54) | 1 parts | 1 parts | 1 parts | 1 parts | 1 parts |
| Test Result | Dielectric constant | 2.97 | 2.98 | 2.96 | 3.42 | 2.97 |
| | Dielectric loss factor | 0.003 | 0.003 | 0.003 | 0.006 | 0.003 |

TABLE 1-continued

| Item | Example 1 | Example 2 | Example 3 | Comparative Example 1 | Comparative Example 2 |
|---|---|---|---|---|---|
| Glass transition temperature (° C.) | 126 | 126 | 120 | 122 | 120 |
| Limiting oxygen index (LOI) | 27 | 27 | 27 | 24 | 24 |

Example 4 and Comparative Example 3

In addition to the fibers, 20 wt % of the multicomponent copolymer (P1-1) and the styrene-maleic anhydride binary copolymer (Sartomer SMA4000) were respectively added to a general prepreg formula, to prepare modified prepregs 2-1 and 2-2 with a fiber content of 45 wt %. Then, four prepregs were superimposed, and a copper foil was placed on the upper and lower sides, and pressed for 90 minutes under a pressure of 0.25 MPa at a temperature of 185° C. to prepare a copper clad sheet, which was tested for the dielectric constant, the dielectric loss factor, the glass transition temperature, the limiting oxygen index (LOI), and the peeling strength following the methods below.

(1) Test of dielectric constant and dielectric loss factor

The copper clad sheet was immersed in a copper etching solution to remove the copper foil, so as to obtain a test substrate. The dielectric constant and the dielectric loss factor of the substrate were determined at a frequency of 1 GHz by using the HP4291B dielectric constant tester (manufactured by Hewllet. Packerd Corp.).

(2) Test of glass transition temperature

The copper clad sheet was immersed in a copper etching solution to remove the copper foil, so as to obtain a test substrate. The glass transition temperature of the substrate was determined by using DSC 4000 (manufactured by PerkinElmer Corp.) at a temperature ramping from 30 to 180° C. at a rate of 10 K/min.

(3) Test of limiting oxygen index (LOI)

The copper clad sheet was immersed in a copper etching solution to remove the copper foil, so as to obtain a test substrate. The LOI of the substrate was determined by using an LOI tester, following a standard method as specified in GB/T 2406.2-2009 Determination of burning behavior by oxygen index—Part 2: Ambient-temperature test.

(4) Test of peeling strength

The copper clad sheet was immersed in a copper etching solution, to form a copper foil of 1 cm width, so as to obtain a test substrate. The peeling strength was tested by using a tension meter.

TABLE 2

| | Item | Example 4 | Comparative Example 3 |
|---|---|---|---|
| Formulation ratio | P1-1 | 11 parts | — |
| | SMA4000 | — | 11 parts |
| | Epoxy resin and other component | 44 parts | 44 parts |
| | Glass fiber | 45 parts | 45 parts |
| Test result | Dielectric constant | 3.67 | 3.67 |
| | Dielectric loss factor | 0.01 | 0.01 |
| | Glass transition temperature (° C.) | 145 | 140 |
| | Limiting oxygen index (LOI) | 30 | 26 |
| | Peeling strength (kN/m) | 1.6 | 1.2 |

Comparison of Examples 1 with 2

Comparison of Examples 1 with 2 shows that the performances of the multicomponent copolymers (P1-1 and P1-2) prepared through the two different methods provided in Examples 1-2 are substantially the same.

Comparison of Examples 1 and 2 with Example 3

Comparison of Examples 1 and 2 with Example 3 shows that the addition of a structural unit (IV) represented by N-phenyl maleimide to the multicomponent copolymer contributes to the increase in the heat resistance of the cured product while other properties are substantially maintained unchanged.

Comparison of Examples 1 and 2 with Comparative Example 1

Comparison of Examples 1 and 2 with Comparative Example 1 shows that after the multicomponent copolymer (P1-1 or P1-2) of the present invention is added, the cured product of the thermosetting resin has obviously reduced dielectric constant and dielectric loss; enhanced glass transition temperature, thus having a better heat resistance; and increased LOI, thus having a certain flame resistance.

Comparison of Example 3 with Comparative Example 1

Comparison of Example 3 with Comparative Example 1 shows that after the multicomponent copolymer (P1-3) is added, the cured product of the thermosetting resin has obviously reduced dielectric constant and dielectric loss; substantially unchanged glass transition temperature; and increased LOI, thus having a certain flame resistance.

Comparison of Examples 1 and 2 with Comparative Example 2

Comparison of Examples 1 and 2 with Comparative Example 2 shows that compared with the situation where a styrene-maleic anhydride binary copolymer is added, after the multicomponent copolymer (P1-1 or P1-2) of the present invention is added, the cured product of the thermosetting resin has comparable dielectric constant and dielectric loss; enhanced glass transition temperature, thus having a better heat resistance; and increased LOI, thus having a certain flame resistance.

Comparison of Example 3 with Comparative Example 2

Comparison of Example 3 with Comparative Example 2 shows that the LOI of the cured product can be increased by introducing the phosphorous element to the system by adding the structural unit (I) to the multicomponent copolymer, whereby the cured product has a certain flame resistance.

Comparison of Example 4 with Comparative Example 3

Comparison of Example 4 with Comparative Example 3 shows that compared with the situation where a styrene-maleic anhydride binary copolymer is added, after the multicomponent copolymer (P1-1) of the present invention is added, the cured product of the thermosetting resin has comparable dielectric constant and dielectric loss; enhanced glass transition temperature, thus having a better heat resistance, increased LOI, thus having a certain flame resistance, and improved peeling strength and thus better adhesion to a copper foil.

The objects, technical solutions and advantages of the present invention have been described in detail by way of specific embodiments above. It is to be understood that the above is merely a specific example of the present invention and is not intended to limit the present invention. Any modifications, equivalent substitutions, and improvements made without departing from the spirit and principles of the present invention are intended to be contemplated within the scope of the present invention.

What is claimed is:

1. A curable thermosetting resin composition, comprising a multicomponent copolymer and an epoxy resin, wherein
the multicomponent copolymer is a ternary or quaternary copolymer comprising structural units selected from the group consisting of unit (I), unit (II), unit (III) and (IV), wherein the structural units (I), (II), and (III) are essential structural units,
wherein the structural unit (I) is:

the structural unit (II) is:

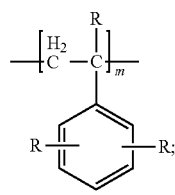

the structural unit (III) is:

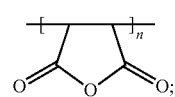

and
the structural unit (IV) is:

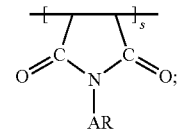

wherein m, n, r and s are natural numbers denoting the molar fraction of corresponding building blocks in the copolymers respectively, R is selected from the group consisting of hydrogen, aromatic group and aliphatic group, and AR is an aromatic group; and
the epoxy resin is one or more selected from a group consisting of aromatic epoxy compound, alicyclic epoxy compound and aliphatic epoxy compound.

2. The curable thermosetting resin composition according to claim 1, wherein in the multicomponent copolymer, the structural unit (I) accounts for 0.1-60 wt % of the copolymer, a molar ratio of the structural unit (II) to the structural unit (III) is 1:1-20:1, and the structural unit (IV) accounts for 0-60 wt % of the copolymer.

3. The curable thermosetting resin composition according to claim 1, wherein the multicomponent copolymer is curable together with the epoxy resin.

4. The curable thermosetting resin composition according to claim 1, wherein the weight ratio of the multicomponent copolymer to the epoxy resin in the composition is 5-100: 100.

5. The curable thermosetting resin composition according to claim 1, wherein the cured product of the curable thermosetting resin composition has a glass transition temperature of at least 120° C., and at a frequency of 1 GHZ or higher, the curable thermosetting resin composition has a dielectric constant of 3.1 or less and a dielectric loss factor of 0.01 or less.

6. A composite material, comprising a reinforcing component and a curable thermosetting resin composition,
wherein the curable thermosetting resin composition, comprising a multicomponent copolymer and an epoxy resin,
wherein the multicomponent copolymer is a ternary or quaternary copolymer comprising structural units selected from the group consisting of unit (I), unit (II), unit (III) and (IV), wherein the structural units (I), (II), and (III) are essential structural units,
wherein the structural unit (I) is:

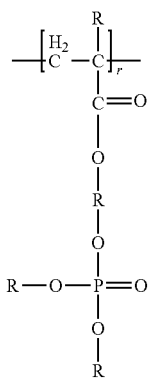

the structural unit (II) is:

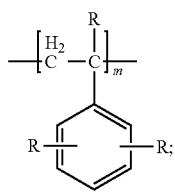

the structural unit (III) is:

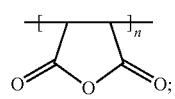

and
the structural unit (IV) is:

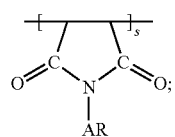

wherein m, n, r and s are natural numbers denoting the molar fraction of corresponding building blocks in the copolymers respectively, R is selected from the group consisting of hydrogen, aromatic group and aliphatic group, and AR is an aromatic group; and the epoxy resin is one or more selected from a group consisting of aromatic epoxy compound, alicyclic epoxy compound and aliphatic epoxy compound.

7. The composite material according to claim 6, wherein the reinforcing component is selected from the group consisting of glass fiber, quartz fiber, basalt fiber, aramid fiber, and other fibers used as a reinforcement in a composite material.

8. The composite material, comprising a reinforcing component and a curable thermosetting resin composition according to claim 6, wherein in the multicomponent copolymer, the structural unit (I) accounts for 0.1-60 wt % of the copolymer, a molar ratio of the structural unit (II) to the structural unit (III) is 1:1-20:1, and the structural unit (IV) accounts for 0-60 wt % of the copolymer.

9. The composite material, comprising a reinforcing component and a curable thermosetting resin composition according to claim 6, wherein the multicomponent copolymer is curable together with the epoxy resin.

10. The composite material, comprising a reinforcing component and a curable thermosetting resin composition according to claim 6, wherein the weight ratio of the multicomponent copolymer to the epoxy resin in the composition is 5-100:100.

11. The composite material, comprising a reinforcing component and a curable thermosetting resin composition according to claim 6, wherein the cured product of the curable thermosetting resin composition has a glass transition temperature of at least 120° C., and at a frequency of 1 GHZ or higher, the curable thermosetting resin composition has a dielectric constant of 3.1 or less and a dielectric loss factor of 0.01 or less.

* * * * *